(12) United States Patent
Kaita et al.

(10) Patent No.: US 12,103,513 B2
(45) Date of Patent: Oct. 1, 2024

(54) VEHICLE CONTROLLER

(71) Applicant: TOYOTA JIDOSHA KABUSHIKI KAISHA, Aichi-ken (JP)

(72) Inventors: Keiji Kaita, Miyoshi (JP); Takahiko Hirasawa, Toyota (JP); Kentaro Otokubo, Nagoya (JP); Hirotaka Omisha, Nisshin (JP); Kimihiro Nakayama, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 375 days.

(21) Appl. No.: 17/678,050

(22) Filed: Feb. 23, 2022

(65) Prior Publication Data
US 2022/0281438 A1    Sep. 8, 2022

(30) Foreign Application Priority Data

Mar. 3, 2021  (JP) ................. 2021-033466

(51) Int. Cl.
*B60W 20/20*    (2016.01)
*B60W 20/40*    (2016.01)
*B60W 30/182*   (2020.01)
*B60W 40/08*    (2012.01)
*B60W 60/00*    (2020.01)

(52) U.S. Cl.
CPC ............ *B60W 20/40* (2013.01); *B60W 20/20* (2013.01); *B60W 30/182* (2013.01); *B60W 40/08* (2013.01); *B60W 60/001* (2020.02); *B60W 2510/081* (2013.01); *B60W 2540/22* (2013.01)

(58) Field of Classification Search
CPC ...... B60W 20/20; B60W 20/40; B60W 40/08; B60W 60/001; B60W 2510/081; B60W 2540/22; B60W 30/182
See application file for complete search history.

(56) References Cited

U.S. PATENT DOCUMENTS 9,574,472 B1 *   2/2017   Dufford ................. F01N 1/161
2008/0240457 A1 * 10/2008  Inoue ............... G10K 11/17855
                                                           381/71.4

(Continued)

FOREIGN PATENT DOCUMENTS

JP        H08-332896 A    12/1996
JP        2006193002 A     7/2006

(Continued)

*Primary Examiner* — Edwin A Young
(74) *Attorney, Agent, or Firm* — HAUPTMAN HAM, LLP

(57) ABSTRACT

A vehicle controller controls a power train of a vehicle and is configured to switch control of the power train between first control and second control. The second control reduces operating noise of the power train by a greater degree than the first control. The vehicle controller is configured to based on sounds in a passenger compartment, perform mood determination in order to determine whether an occupant of the vehicle is in a state of high tolerance for the operating noise or in a state of low tolerance for the operating noise; control the power train through the first control when determining that the occupant is in the state of high tolerance through the mood determination; and control the power train through the second control when determining that the occupant is in the state of low tolerance through the mood determination.

17 Claims, 8 Drawing Sheets

(56) References Cited

U.S. PATENT DOCUMENTS

| | | |
|---|---|---|
| 2009/0030568 A1 | 1/2009 | Amano et al. |
| 2018/0056978 A1* | 3/2018 | Hata et al. |
| 2018/0105163 A1* | 4/2018 | Matsubara ............ B60W 10/06 |
| 2018/0347491 A1* | 12/2018 | Rousseau ............... F02D 41/064 |
| 2019/0049957 A1 | 2/2019 | Healey et al. |
| 2019/0061735 A1 | 2/2019 | Huelsmann et al. |
| 2020/0239005 A1 | 7/2020 | Zijderveld et al. |

FOREIGN PATENT DOCUMENTS

| | | |
|---|---|---|
| JP | 2007-223357 A | 9/2007 |
| JP | 2011-218872 A | 11/2011 |
| JP | 2019-133511 A | 8/2019 |

* cited by examiner

VEHICLE CONTROLLER

RELATED APPLICATIONS

The present application claims priority of Japanese Application Number 2021-033466 filed on Mar. 3, 2021, the disclosure of which is hereby incorporated by reference herein in its entirety.

BACKGROUND

1. Field

The present disclosure relates to a vehicle controller.

2. Description of Related Art

Many vehicles such as passenger cars have an improved sound insulation performance of passenger compartments so as to prevent operating noise of a power train such as engine noise from becoming disturbing noise. On the other hand, some vehicle users consider engine noise to be pleasant. Japanese Laid-Open Patent Publication No. 2006-193002 discloses a vehicle on-board device for such users. The vehicle on-board device of the publication generates simulated engine noise and supplies it to the passenger compartment through speakers. Further, the vehicle on-board device also adjusts the tonal quality of the simulated engine noise to be supplied to the passenger compartment in accordance with music being played by a vehicle on-board audio system.

The actual engine noise is also transmitted to the passenger compartment. As such, in order that the vehicle on-board device disclosed in the above publication achieve a satisfactory effect of the simulated engine noise supplied to the passenger compartment, the volume of the simulated engine noise needs to be louder than the volume of the actual engine noise that is transmitted to the passenger compartment. Accordingly, the vehicle on-board device disclosed in the above publication is employed in selected types of vehicles such as luxury cars, which have a high sound insulation performance for the passenger compartments and are owned by users who desire loud engine noise.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle controller controls a power train of a vehicle. The vehicle controller is configured to switch control of the power train between first control and second control. The second control reduces operating noise of the power train by a greater degree than the first control. The vehicle controller is configured to: based on sounds in a passenger compartment, perform mood determination in order to determine whether an occupant of the vehicle is in a state of high tolerance for the operating noise or in a state of low tolerance for the operating noise; control the power train through the first control when determining that the occupant is in the state of high tolerance through the mood determination; and control the power train through the second control when determining that the occupant is in the state of low tolerance through the mood determination.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A vehicle controller 28 according to one embodiment will be described with reference to FIGS. 1 to 4. The vehicle controller 28 according to the present embodiment is mounted on a hybrid electric vehicle.

<Configuration of Power Train>

Figure 1:
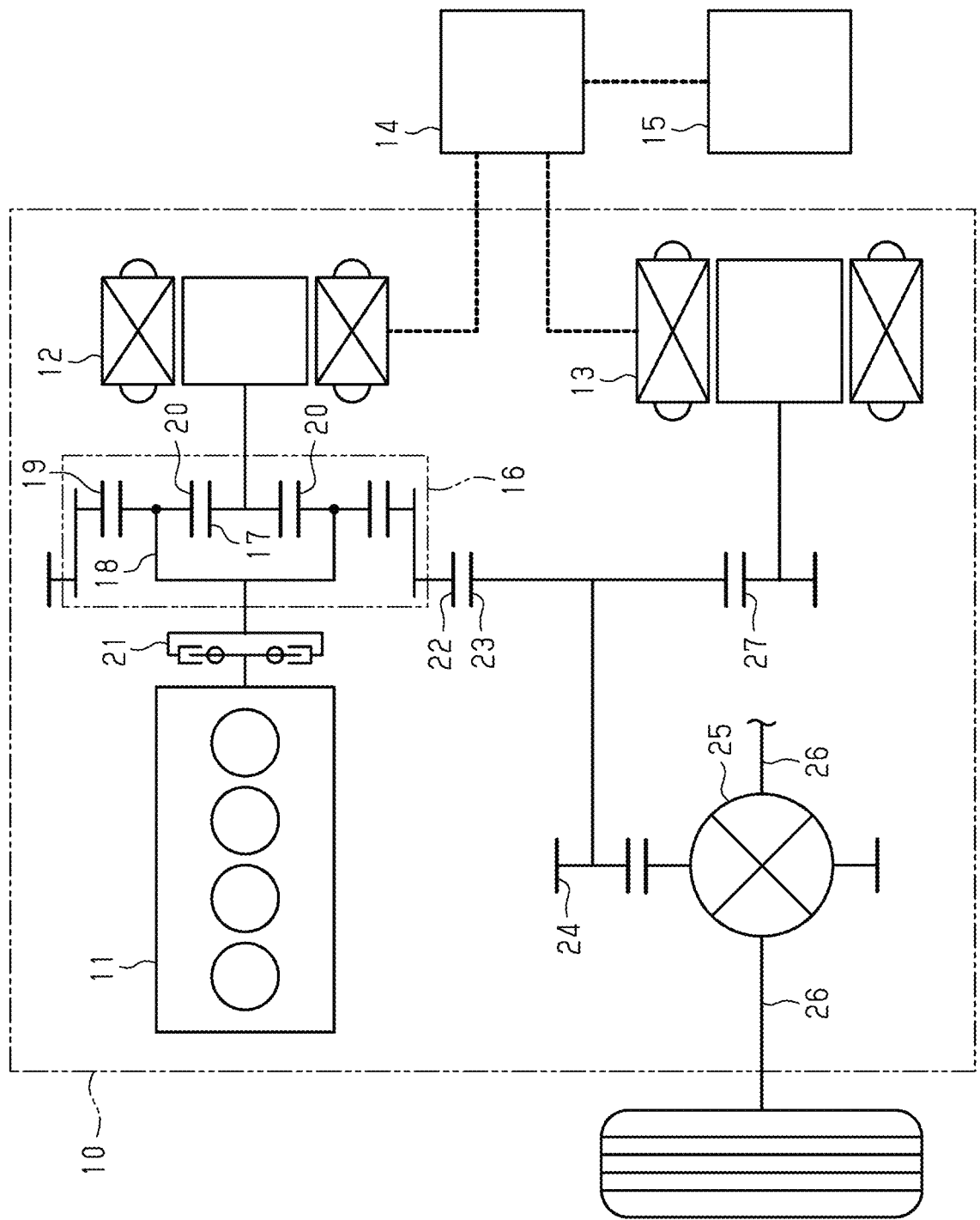
FIG. 1 is a schematic diagram showing a power train of a hybrid electric vehicle according to one embodiment.

A power train 10 of the hybrid electric vehicle that mounts the vehicle controller 28 according to the present embodiment will be described with reference to FIG. 1. The power train 10 of the hybrid electric vehicle includes an internal combustion engine 11, a first generator motor 12, and a second generator motor 13. The first generator motor 12 and the second generator motor 13 each function as an electric motor that generates a driving force when supplied with power and also function as a generator that generates power when receiving external force. The first generator motor 12 and the second generator motor 13 are connected to a battery 15 via an inverter 14. The inverter 14 adjusts the amount of power transferred between the generator motors 12, 13 and the battery 15.

The power train 10 includes a power splitting mechanism 16. The power splitting mechanism 16 includes three rotational elements: a sun gear 17, a planetary carrier 18, and a ring gear 19. The sun gear 17, which is an external gear, is arranged on the inner side of the ring gear 19, which is an internal gear. Planetary gears 20 are arranged between the sun gear 17 and the ring gear 19. The planetary gears 20 mesh with both the sun gear 17 and the ring gear 19. The planetary gears 20 are attached to the planetary carrier 18 so as to rotate and orbit. The sun gear 17 is connected to and rotates integrally with a rotary shaft of the first generator motor 12. The planetary carrier 18 is coupled to an output shaft of the internal combustion engine 11 via a damper mechanism 21.

A counter drive gear 22, which is an external gear, is coupled to and rotates integrally with the ring gear 19. The counter drive gear 22 is meshed with a counter driven gear 23. A differential drive gear 24 is coupled to and rotates integrally with the counter driven gear 23. The differential drive gear 24 is connected to left and right axles 26 via a differential gear 25, which is a differential mechanism. The counter driven gear 23 is also meshed with a reduction gear 27. The reduction gear 27 is coupled to and rotates integrally with a rotary shaft of the second generator motor 13.

<Configuration of Vehicle Controller>

Figure 2:
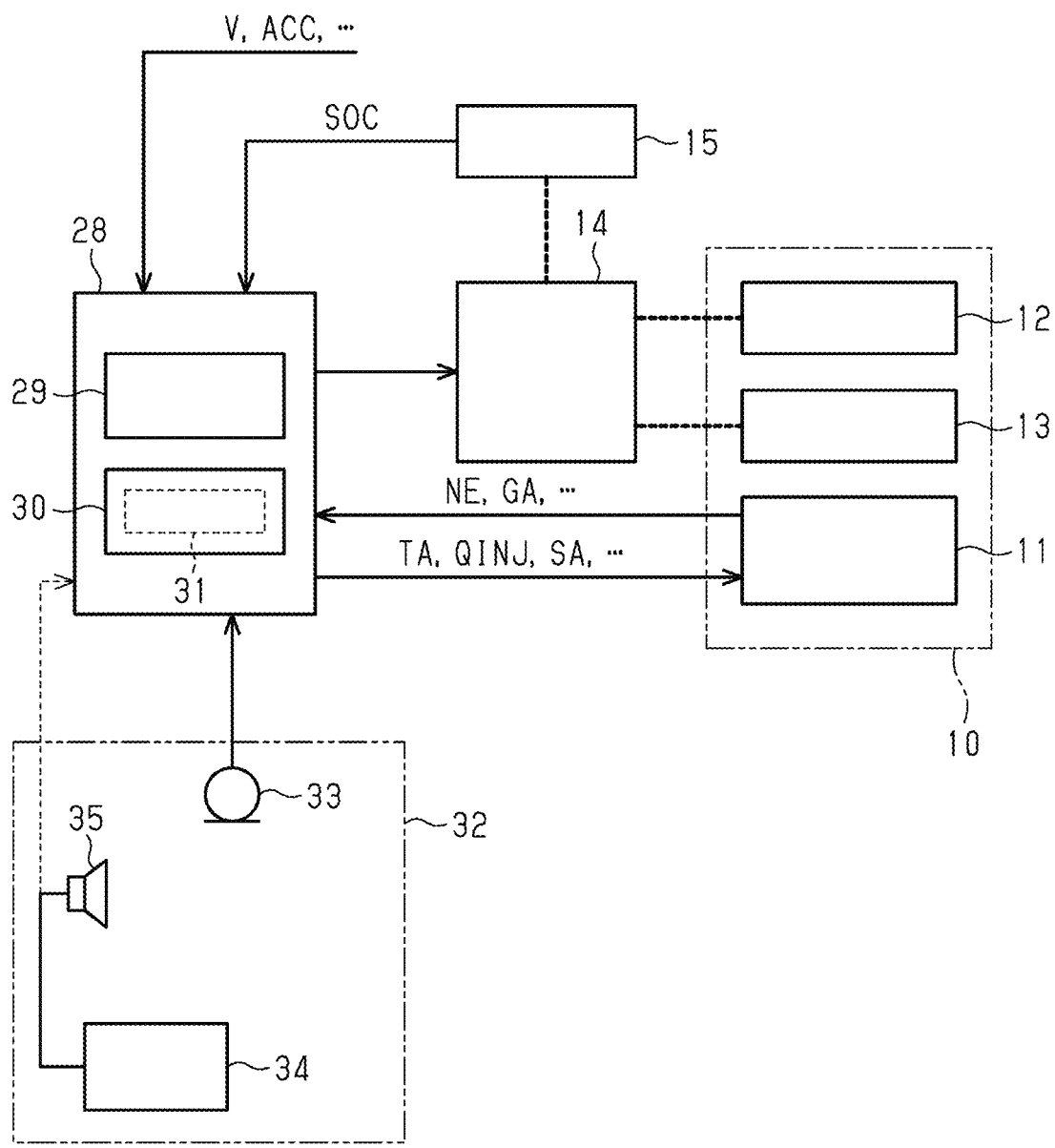
FIG. 2 is a schematic diagram showing a configuration of a vehicle controller mounted on the hybrid electric vehicle shown in FIG. 1.

Next, the configuration of the vehicle controller 28 according to the present embodiment will be described with reference to FIG. 2. The vehicle controller 28 is an electronic control unit for controlling a vehicle. The vehicle controller 28 includes a processor 29 and a memory device 30. The memory device 30 stores programs and data used to control the power train 10 in advance. The processor 29 executes various processes related to control of the power train 10 by reading and executing programs stored in the memory device 30.

The vehicle controller 28 receives state quantities indicating the operating state of the internal combustion engine 11 from the internal combustion engine 11. The state quantities that indicate the operating state of the internal combustion engine 11 include a rotation speed NE and an intake air amount GA of the internal combustion engine 11. The vehicle controller 28 also receives state quantities that indicate the state of the battery 15 from the battery 15. The state quantities that indicate the battery 15 include a state of charge SOC of the battery 15. The vehicle controller 28 further receives state quantities indicating the traveling state of the vehicle such as a vehicle speed V and state quantities indicating the manipulation state of the driver such as an accelerator operation amount ACC.

Based on the obtained state quantities, the vehicle controller 28 controls the internal combustion engine 11, the first generator motor 12, and the second generator motor 13, thereby controlling the power train 10. For example, when controlling the internal combustion engine 11, the vehicle controller 28 determines various operation amounts of the internal combustion engine 11 based on the obtained state quantities. The operation amounts of the internal combustion engine 11 include a throttle opening degree TA, a fuel injection amount QINJ, and an ignition timing SA. The vehicle controller 28 operates the internal combustion engine 11 in accordance with the determined operation amounts, thereby controlling the internal combustion engine 11. When controlling the first generator motor 12 and the second generator motor 13, the vehicle controller 28 first determines driving/regenerative torque of the generator motors 12, 13 based on the obtained state quantities. The vehicle controller 28 operates the inverter 14 based on the determined driving/regenerative torque, thereby controlling the generator motors 12, 13. Through operation of the inverter 14, the vehicle controller 28 adjusts the power transferred between the generator motors 12, 13 and the battery 15 through the pulse width modulation.

The vehicle controller 28 receives an output signal of a microphone 33 installed in a passenger compartment 32. A vehicle on-board audio system 34 is installed in the passenger compartment 32. The vehicle on-board audio system 34 includes a speaker 35.

<Occupant Mood Determination>

While the vehicle is traveling, the vehicle controller 28 captures sounds in the passenger compartment 32, such as music being played by the vehicle on-board audio system 34 and conversations between occupants through the microphone 33. Based on the captured sounds, the vehicle controller 28 performs occupant mood determination to determine whether an occupant is feeling uplifted or calm. That is, the vehicle controller 28 of the present embodiment performs the occupant mood determination based on signals output by the microphone 33 installed in the passenger compartment 32.

The vehicle controller 28 uses a determiner 31 stored in the memory device 30 to perform the occupant mood determination. The determiner 31 is a neural network that uses time-series data of the output signal of the microphone 33 as inputs, and outputs a determination result variable, which indicates a result of the mood determination. The value of the determination result variable numerically presents an elevation level of the mood of an occupant.

The neural network is trained in the following manner That is, in training of the neural network, sounds in various situations in the passenger compartment 32 are recorded. Sensory evaluation is performed for the mood of an occupant at the time of recording each of the recorded sounds. An evaluator listens to a sound recorded in the passenger compartment 32, and scores the elevation level of the mood of an occupant that is estimated from the sound. The evaluator estimates the elevation level of the mood of the occupant based on the content and tone of conversation and the impression and volume of the music contained in the sounds recorded in the passenger compartment 32. For each recorded sound, a data set is generated in which the waveform signal of that sound and the value of the determination result variable corresponding to the score of the sensory evaluation are associated with each other. The training of the neural network is performed by using, as training data, a large number of data sets generated in the above-described manner. The memory device 30 stores the neural network obtained through such machine learning as the determiner 31.

<Control of Power Train 10>

Next, control of the power train 10 performed by the vehicle controller 28 will be described. When controlling the power train 10 during traveling of the vehicle, the vehicle controller 28 first determines a required driving force, which is a required value of the driving force of the vehicle generated by the entire power train 10, based on the vehicle speed V and the accelerator operation amount ACP. Also, the vehicle controller 28 determines a target output of the internal combustion engine 11 based on parameters such as the determined required driving force and the state of charge SOC of the battery 15. Further, based on the target output, the vehicle controller 28 determines a target rotation speed and a target load factor of the internal combustion engine 11. The target rotation speed is a control target value of the rotation speed NE of the internal combustion engine 11. The target load factor is a control target value of a load factor KL of the internal combustion engine 11. The load factor KL represents a charging efficiency η of intake air of each cylinder of the internal combustion engine 11. The vehicle controller 28 operates the throttle opening degree TA of the internal combustion engine 11 so as to achieve a load factor equal to the target load factor. Also, the vehicle controller 28 performs feedback control of the driving/regenerative torque of the first generator motor 12 in order that the rotation speed NE of the internal combustion engine 11 agree with the target rotation speed. The vehicle controller 28 then controls the driving/regenerative torque of the second generator motor 13 so as to acquire the driving force corresponding to the required driving force.

<Setting of Target Rotation Speed>

The vehicle controller 28 changes the manner in which the target rotation speed of the internal combustion engine 11 is set in accordance with the result of the above-described occupant mood determination. First, conditions under which the target rotation speed is set by the vehicle controller 28 of the present embodiment will be described.

Figure 3:
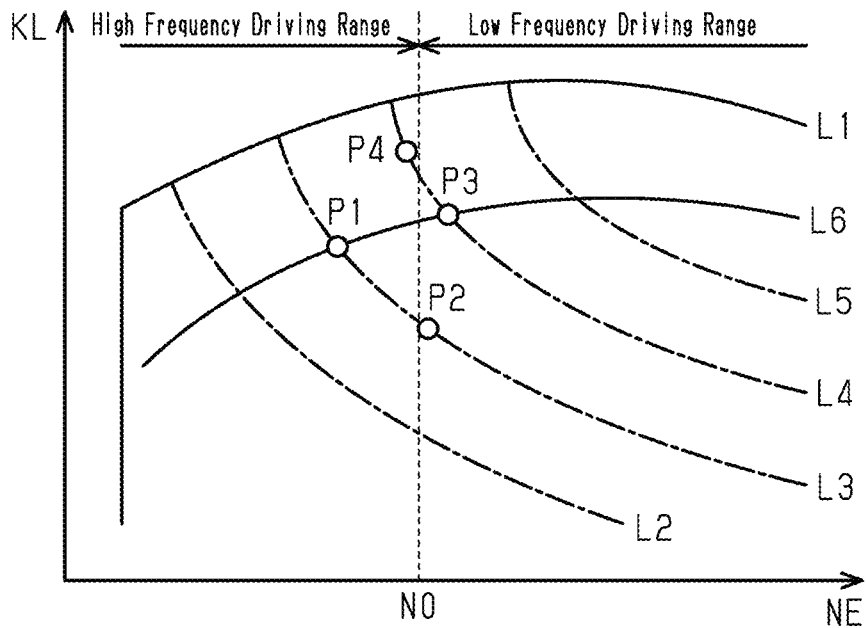
FIG. 3 is a diagram showing a manner in which a target rotation speed of an internal combustion engine of FIG. 1 is set.

FIG. 3 shows a Cartesian coordinate system in which the horizontal axis represents the rotation speed NE of the internal combustion engine 11, and the vertical axis represents the load factor KL of the internal combustion engine 11. A maximum torque line L1, equal output lines L2 to L5, and an optimum fuel efficiency line L6 are plotted on the Cartesian coordinate system. The maximum torque line L1 is obtained by connecting the values of the load factor KL at which torque TE is maximized for respective rotation speeds of the internal combustion engine 11. The equal output lines L2 to L5 are obtained by connecting operating points of the internal combustion engine 11 at which the output of the internal combustion engine 11 is constant. FIG. 3 shows four equal output lines L2 to L5, which correspond to different values of output. The optimum fuel efficiency line L6 is obtained by connecting operating points at which the fuel efficiency is maximized for the respective values of the output of the internal combustion engine 11.

In respect of the fuel efficiency performance of the internal combustion engine 11, the internal combustion engine 11 preferably operates at operating points on the optimum fuel efficiency line L6. For example, when the target output has a value corresponding to the equal output line L3, the target rotation speed and the target load factor are preferably set to the values of the rotation speed NE and the load factor KL at an operating point P1, which is the intersection of the equal output line L3 and the optimum fuel efficiency line L6. In the following description, values of the rotation speed NE and the load factor KL at an operating point on the optimum fuel efficiency line L6 at which the target output is obtained are respectively referred to as an optimum fuel efficiency rotation speed and an optimum fuel efficiency load factor.

The rotation speed NE of the internal combustion engine 11 is adjusted through the feedback control of the driving/regenerative torque of the first generator motor 12. Also, the driving/regenerative torque of the first generator motor 12 is controlled through the pulse width modulation control by the inverter 14. It has been known that operating noise and power loss due to switching of the inverter 14 change according to the frequency of the carrier wave of the pulse width modulation control, that is, the carrier frequency. Specifically, if the carrier frequency is lowered, the volume of the operating noise of the inverter 14 increases, and the power loss decreases. When the carrier frequency increases, the volume of the operating noise of the inverter 14 decreases, and the power loss increases. In contrast, when the rotation speed NE of the internal combustion engine 11 increases, the operating noise of the internal combustion engine 11 increases, so that the operating noise of the inverter 14 becomes indistinct. Accordingly, when the rotation speed NE is low, so that the operating noise of the internal combustion engine 11 is low, the vehicle controller 28 increases the carrier frequency, thereby reducing the operating noise of the inverter 14. In contrast, when the rotation speed NE is high, so that the operating noise of the internal combustion engine 11 is loud, the vehicle controller 28 reduces the carrier frequency, thereby reducing the power loss of the inverter 14. In the following description, operation of the inverter 14 with the carrier frequency set high will be referred to as a high frequency operation. Also, operation of the inverter 14 with the carrier frequency set low will be referred to as a low frequency operation. In the present embodiment, the vehicle controller 28 performs the high frequency operation of the inverter 14 when the rotation speed NE of the internal combustion engine 11 is less than a specified switching rotation speed N0. The vehicle controller 28 performs the low frequency operation of the inverter 14 when the rotation speed NE is greater than or equal to the switching rotation speed N0. In the following description, a range of the rotation speed NE in which the high frequency operation of the inverter 14 is performed, that is, a range of the rotation speed NE below the switching rotation speed N0, will be referred to as a high frequency driving range. Also, a range of the rotation speed NE in which the low frequency operation of the inverter 14 is performed, that is, a range of the rotation speed NE greater than or equal to the switching rotation speed N0, will be referred to as a low frequency driving range of the rotation speed NE.

In the hybrid electric vehicle that employs the vehicle controller 28 of the present embodiment, the carrier frequency of the inverter 14 during the low frequency operation is set to a frequency in the human hearing range. On the other hand, the carrier frequency during the high frequency operation is set to a frequency out of the human hearing range, that is, a frequency higher than the upper limit of the hearing range. A predominant frequency component of the operating noise of the inverter 14 is the same as the carrier frequency. Thus, during the low frequency operation, the frequency component in the human hearing range is increased in the frequency components contained in the operating noise of the inverter 14.

Figure 4:
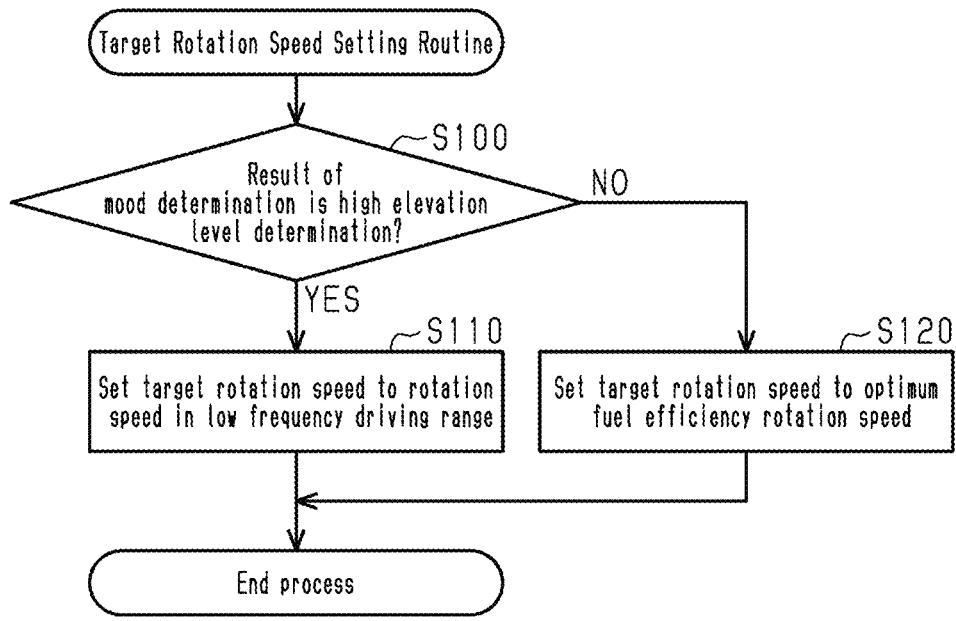
FIG. 4 is a flowchart of a target rotation speed setting routine executed by the vehicle controller shown in FIG. 2.

FIG. 4 shows a procedure of a target rotation speed setting routine executed by the vehicle controller 28 when setting the target rotation speed. The vehicle controller 28 starts the processes of this routine after determining the target output of the internal combustion engine 11. The vehicle controller 28 ends this routine after setting the target rotation speed in step S110 or step S120.

When starting the routine, the vehicle controller 28 first performs the occupant mood determination in step S100. Specifically, when performing the mood determination, the vehicle controller 28 inputs time-series data of the waveform signal of sounds in the passenger compartment 32 captured by the microphone 33 to the neural network, which is the determiner 31. The vehicle controller 28 then calculates an output of the neural network in response to the input, that is, the value of the determination result variable. Based on the calculated value of the determination result variable, the vehicle controller 28 determines whether the occupant is in an elevated mood. For example, determination as to whether the occupant is in an elevated mood is performed based on whether the calculated value of the determination result variable is greater than a specified determination value. When it is determined that the occupant is in an elevated mood through the mood determination (YES), the vehicle controller 28 advances the process to step S110. When the occupant is not determined to in an elevated mood (NO), the vehicle controller 28 advances the process to step S120.

When the process is advanced to step S120, the vehicle controller 28 sets the target rotation speed to the optimum fuel efficiency rotation speed corresponding to the target output in step S120. In this case, the target load factor is set to the optimum fuel efficiency load factor corresponding to the target output.

When the process is advanced to step S110, the vehicle controller 28 sets the target rotation speed to a value of the rotation speed NE in the low frequency driving range in step S110. Specifically, when the optimum fuel efficiency rotation speed corresponding to the target output is within the low frequency driving range, the target rotation speed is set to the optimum fuel efficiency rotation speed. In this case, the target load factor is set to the optimum fuel efficiency load factor corresponding to the target output. When the optimum fuel efficiency rotation speed corresponding to the fuel target output is within the high frequency driving range, the vehicle controller 28 sets the target rotation speed to a value of the rotation speed NE in the low frequency driving range. For example, the target rotation speed is set to the switching rotation speed N0 or to a value of the rotation speed NE that is slightly higher than the switching rotation speed N0. At this time, the target load factor is set to a value of the load factor KL at an operating point at which the rotation speed NE is the set target rotation speed and that is on an equal output line that corresponds to the target output.

With reference to FIG. 3, a manner in which the target rotation speed is set in the target rotation speed setting routine will be described. It is now assumed that an output of the internal combustion engine 11 corresponding to the equal output line L3 in FIG. 3 is determined to be the value of the target output. As shown in FIG. 3, the rotation speed NE at the operating point P1, which is the intersection of the equal output line L3 and the optimum fuel efficiency line L6, is lower than the switching rotation speed N0. When it is determined that the occupant is not in an elevated mood in the mood determination, the target rotation speed and the target load factor are respectively set to the rotation speed NE and the load factor KL at the operating point P1, that is, the optimum fuel efficiency rotation speed and the optimum fuel efficiency load factor. When it is determined that the occupant is in an elevated mood in the mood determination, the target rotation speed and the target load factor are respectively set to the rotation speed NE and the load factor KL at the operating point P2 on the equal output line L3, at which the rotation speed NE is higher than the switching rotation speed N0.

When it is determined that the occupant is in an elevated mood in the mood determination, the target rotation speed is set to a value greater than or equal to the switching rotation speed N0 regardless of the target output. Thus, while it is determined that the occupant is in an elevated mood in the mood determination, the low frequency operation of the inverter 14 is continued. When it is determined that the occupant is not in an elevated mood in the mood determination, and the target output of the internal combustion engine 11 is set to a relatively large value, the target rotation speed is set to be greater than or equal to the switching rotation speed N0. When the target output of the internal combustion engine 11 is set to a relatively small value, the target rotation speed is set to be less than the switching rotation speed N0. When it is determined that the occupant is not in an elevated mood in the mood determination, the operation of the inverter 14 is switched from one of the high frequency operation and the low frequency operation to the other in accordance with the output of the internal combustion engine 11.

<Operation and Advantages of Embodiment>

Operation and advantages of the present embodiment will now be described.

The mood of the occupant can be estimated to a certain extent from the sounds in the passenger compartment 32 such as conversation between occupants and music being played by the vehicle on-board audio system 34. For example, when the conversation is lively or when an up-tempo piece of music is being played, the elevation level of the mood of the occupant is estimated to be relatively high. Also, when the conversation is halting or when a slow-tempo piece of music is being played, the elevation level of the occupant's mood is estimated to be relatively low.

Even if the operating noise of the inverter 14 transmitted to the passenger compartment 32 has the same volume and quality, the occupant may find the noise annoying or pleasant depending on the mood of the occupant. That is, the occupant's tolerance for the operating noise of the inverter 14 changes depending on the mood of the occupant. The occupant is less likely to find the operating noise of the inverter 14 annoying when the occupant is in an elevated mood than when the occupant is not in an elevated mood. That is, the tolerance for the operating noise of the inverter 14 is high. Further, when the occupant is in an elevated mood, the operating noise of the inverter 14 may further heighten the mood of the occupant.

The vehicle controller 28 performs the occupant mood determination in order to determine whether the occupant is in an elevated mood based on the sounds in the passenger compartment 32. In the following description, the determination that the occupant is in an elevated mood will be referred to as a high elevation level determination. Also, the determination that the occupant is not in an elevated mood will be referred to as a low elevation level determination. When the outcome of the mood determination is the high elevation level determination, the vehicle controller 28 sets the target rotation speed of the internal combustion engine 11 such that the inverter 14 continues the low frequency operation. The operating noise of the inverter 14 is louder during the low frequency operation than during the high frequency operation. However, the occupant's tolerance for the operating noise of the power train 10, which includes the inverter 14, is thought to be higher when the high elevation level determination is made than when the low elevation level determination is made as described above. Thus, even if the low frequency operation continues, the occupant is less likely to feel annoyed by the operating noise of the inverter 14. At this time, since the low frequency operation, which has a relatively low power loss, continues, the energy efficiency of the vehicle is relatively high.

When the low elevation level determination is made, the output of the internal combustion engine 11 is relatively low, and the operating noise of the internal combustion engine 11 is relatively low. At this time, the inverter 14 performs the high frequency operation. During the high frequency operation, the operating noise of the inverter 14 is relatively low, and the frequency of the operating noise is out of the human hearing range. Thus, even if the occupant's tolerance for the operating noise of the inverter 14 is relatively low, the occupant is unlikely to find the operating noise of the inverter 14 annoying. Also, when the low elevation level determination is made, the inverter 14 performs the low frequency operation if the output of the internal combustion engine 11 is relatively high. At this time, however, the operating noise of the internal combustion engine 11 and other devices is also loud. Thus, drawback is unlikely to be caused even if the low frequency operation increases the operating noise of the inverter 14 to some extent.

In a case in which the target output is lower than an output at which the optimum fuel efficiency rotation speed is equal to the switching rotation speed N0, the target rotation speed is set to a lower value of the rotation speed NE when the low elevation level determination is made than when the high elevation level determination is made. In such a case, the rotation speed NE of the internal combustion engine 11 is lowered in accordance with the low elevation level determination. The sounds generated by the movable components of the internal combustion engine 11 such as the crankshaft and the components that rotate in cooperation with the crankshaft, such as the planetary carrier 18 and the planetary gears 20, become louder as the rotation speed NE of the internal combustion engine 11 increases. It is thus possible to reduce the operating noise of components of the power train 10 other than the inverter 14 by reduction of the rotation speed NE of the internal combustion engine 11 in response to the low elevation level determination described above.

The operating noise of the inverter 14 is lower at the high frequency operation than at the low frequency operation. Thus, the operating noise of the inverter 14 is reduced by a greater degree when the target rotation speed is set to the optimum fuel efficiency rotation speed than when the target rotation speed is set to a value of the rotation speed NE in the low frequency driving range. Control of the power train 10 after the target rotation speed is set to a value of the rotation speed NE in the low frequency driving range in step S110 of FIG. 4 will be referred to as first control. Control of the power train 10 after the target rotation speed is set to the optimum fuel efficiency rotation speed in step S120 of FIG. 4 will be referred to as second control. The second control reduces the operating noise of the power train 10 by a greater degree than the first control of the power train 10.

Also, the first generator motor 12 is controlled to regulate the rotation speed NE of the internal combustion engine 11 to the target rotation speed. In the power train 10, in which the internal combustion engine 11 and the first generator motor 12 are coupled to each other via the power splitting mechanism 16, the rotation speed NE of the internal combustion engine 11 and the rotation speed of the first generator motor 12 change in conjunction with each other. Thus, the first control and the second control can each be considered as control of the rotation speed of the first generator motor 12. The second control adjusts the rotation speed of the first generator motor 12 such that the rotation speed NE of the internal combustion engine 11 becomes lower than in a case in which the first control controls the rotation speed of the first generator motor 12. Also, the first control sets the target rotation speed such that the carrier frequency of the inverter 14, that is, the frequency of the operating noise of the inverter 14, falls within the human hearing range. Therefore, the first control can be considered as control that adjusts the rotation speed of the first generator motor 12 such that the rotation speed NE of the internal combustion engine 11 falls within the range described below. That range is a range of the rotation speed NE of the internal combustion engine 11 in which the frequency component in the human hearing range is increased in the frequency components contained in the operating noise of the power train 10.

The vehicle controller 28 of the present embodiment has the following advantages.

(1) As the control of the power train 10, the vehicle controller 28 of the present embodiment includes the first control and the second control. The second control reduces the operating noise of the power train 10 by a greater degree than the first control of the power train 10. Based on the sounds in the passenger compartment 32, the vehicle controller 28 performs the mood determination in order to determine whether the vehicle occupant is in a state of high tolerance for the operating noise or in a state of low tolerance for the operating noise. The vehicle controller 28 controls the power train 10 through the first control when determining that the tolerance is relatively high through the mood determination. On the other hand, the vehicle controller 28 controls the power train 10 through the second control when determining that the tolerance is relatively low through the mood determination. The operating noise of the power train 10 is properly controlled in accordance with the mood of the occupant.

(2) The mood determination determines the state of mind of a human. It is difficult to construct the determination logic of the mood determination by conventional analytic determination method. However, the present embodiment uses the determiner 31, which has been trained through machine learning, to perform the mood determination based on the output signal of the microphone 33 installed in the passenger compartment 32. This allows the determination logic of the mood determination, which is determination of the state of mind of a human, to be relatively easily constructed.

The present embodiment may be modified as follows. The present embodiment and the following modifications can be combined as long as the combined modifications remain technically consistent with each other.

<Mood Determination>

In the above-described embodiment, the determiner 31, which has been trained through machine learning, is used to perform the occupant mood determination. The occupant mood determination may be performed by some other method. For example, results of frequency analysis of the sounds captured by the microphone 33 can be used to determine how frequently conversation is held and the tone of voice of the occupant, and the impression of the music being played in the passenger compartment 32 by the vehicle on-board audio system 34. The occupant can be estimated to be in an elevated mood if conversation is held frequently or the tone of voice is high. Also, the occupant can be estimated to be in an elevated mood based on the impression of the piece of music being played. It is thus possible to use the results of frequency analysis to perform the occupant mood determination.

In a case in which the mood determination is performed based only on the music being played by the vehicle on-board audio system 34, the mood determination can be performed in the following manner That is, as indicated by dotted lines in FIG. 2, the vehicle controller 28 may directly obtain a signal of the audio output of the vehicle on-board audio system 34 and perform the mood determination based on the signal of the audio output. In this case, the mood determination may be performed by the determiner 31, which has been trained through machine learning, or by a conventional determination method based on a result of frequency analysis of the signal. In some cases, the data of the piece of music played by the vehicle on-board audio system 34 includes, together with the data of the piece of music per se, metadata such as the title, the genre, and the artist of the piece of music. The vehicle controller 28 may obtain the metadata of the piece of music being played from the vehicle on-board audio system 34 and performs the occupant mood determination based on the metadata. For example, the mood determination may be performed based on the genre of the piece of music being played. Specifically, when the genre of the piece of music being played is classical music, the low elevation level determination may be made. When the genre of the piece of music is rock music, the high elevation level determination may be made.

<Mood Determination during Selection of Piece of Music>

When the vehicle occupant is selecting a piece of music with the vehicle on-board audio system 34, a piece of music different from the one the occupant wants to listen to may be played temporarily. If the mood determination is performed based on the sounds in the passenger compartment 32 during such selection of a piece of music, the mood of the occupant may be erroneously determined.

It is thus desirable to suspend the occupant mood determination during selection of a piece of music with the vehicle on-board audio system 34.

Figure 5:
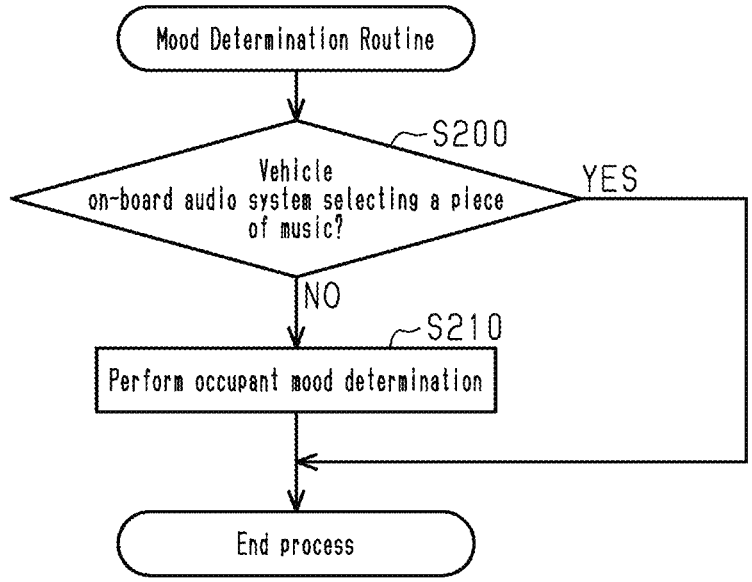
FIG. 5 is a flowchart of a mood determination routine.

FIG. 5 shows one example of a process of mood determination in which determination is suspended during selection of a piece of music. The mood determination routine shown in FIG. 5 is executed by the vehicle controller 28 when performance of the mood determination is requested. When starting this routine, the vehicle controller 28 first determines whether the vehicle on-board audio system 34 is selecting a piece of music in step S200. When determining that a piece of music is not being selected (NO), the vehicle controller 28 performs the occupant mood determination in step S210 and ends the process of this routine. In contrast, when determining that a piece of music is being selected (YES), the vehicle controller 28 ends the process of this routine without performing the mood determination.

The vehicle controller 28 can determine whether the vehicle on-board audio system 34 is selecting a piece of music, for example, by directly obtaining the operation status of the vehicle on-board audio system 34. Also, the vehicle controller 28 can determine whether the vehicle on-board audio system 34 is selecting a piece of music by detecting changes in the impression of the piece of music from the sounds in the passenger compartment 32 captured by the microphone 33. Music selecting action may be performed two or more times before the occupant determines which piece of music the occupant wants to listen to. Thus, after music selecting action is detected, it is desirable to determine that the music selecting action is continuing until a predetermined time elapses.

<Switching of Power Train Control>

In the above-described embodiment, the target rotation speed is set to a value of the rotation speed NE in the low frequency driving range when the high elevation level determination is made, and the target rotation speed is set to the optimum fuel efficiency rotation speed when the low elevation level determination is made. The target rotation speed may be set in a manner described in FIG. 6.

Figure 6:
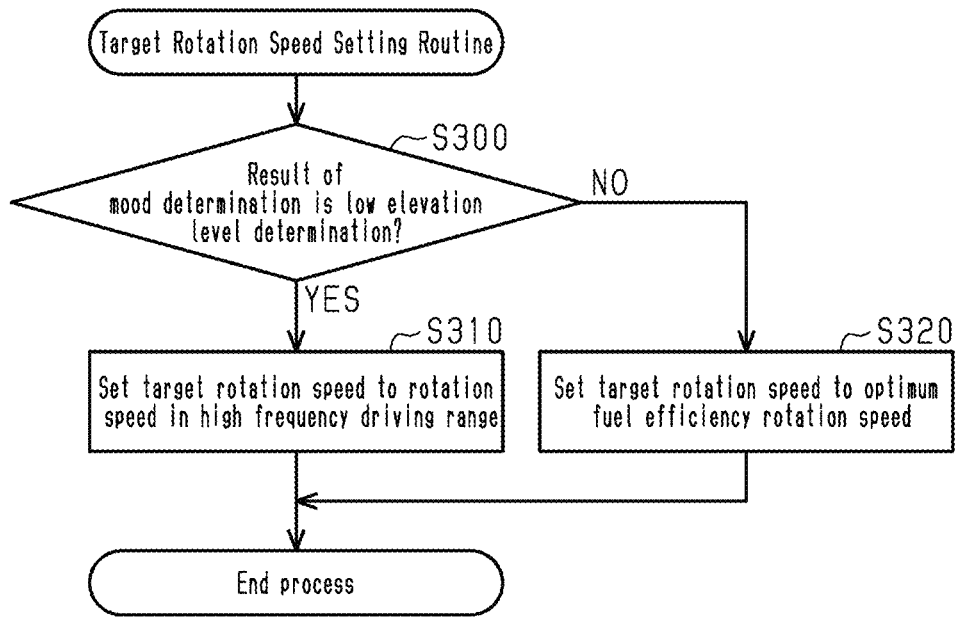
FIG. 6 is a flowchart of a modification of the target rotation speed setting routine.

In the target rotation speed setting routine shown in FIG. 6 also, the vehicle controller 28 first performs the occupant mood determination in step S300 after starting this routine. When the low elevation level determination is made (YES), the vehicle controller 28 advances the process to step S310. In step S310, the vehicle controller 28 sets the target rotation speed to a value of the rotation speed NE in the high frequency driving range. In contrast, when the high elevation level determination is made (S300: NO), the vehicle controller 28 advances the process to step S320. In step S320, the vehicle controller 28 sets the target rotation speed to the optimum fuel efficiency rotation speed.

With reference to FIG. 3, a manner in which the target rotation speed is set in this case will be described. It is now assumed that an output of the internal combustion engine 11 corresponding to the equal output line L4 in FIG. 3 is determined to be the value of the target output. As shown in FIG. 3, the rotation speed NE at an operating point P3, which is the intersection of the equal output line L4 and the optimum fuel efficiency line L6, is higher than the switching rotation speed N0. When the high elevation level determination is made, the target rotation speed and the target load factor are respectively set to the rotation speed NE and the load factor KL at the operating point P3, that is, the optimum fuel efficiency rotation speed and the optimum fuel efficiency load factor. When the low elevation level determination is made, the target rotation speed and the target load factor are respectively set to the rotation speed NE and the load factor KL at an operating point P4 on the equal output line L4, at which the rotation speed NE is lower than the switching rotation speed N0. Thus, when the low elevation level determination is made, the low frequency operation of the inverter 14, which increases the operating noise, will not be performed. In this manner of setting the target rotation speed, the control of the power train 10 after the target rotation speed is set to the optimum fuel efficiency rotation speed in step S320 corresponds to the first control. Also, the control of the power train 10 after the target rotation speed is set to a value of the rotation speed NE in the high frequency driving range in step S310 corresponds to the second control. The second control in this case adjusts the rotation speed of the first generator motor 12 such that the rotation speed NE of the internal combustion engine 11 becomes a value outside the range described below. That range is a range of the rotation speed NE of the internal combustion engine 11 in which the frequency component in the human hearing range is increased in the frequency components contained in the operating noise of the power train 10.

<Process of Switching Target Rotation Speed>

Figure 7:
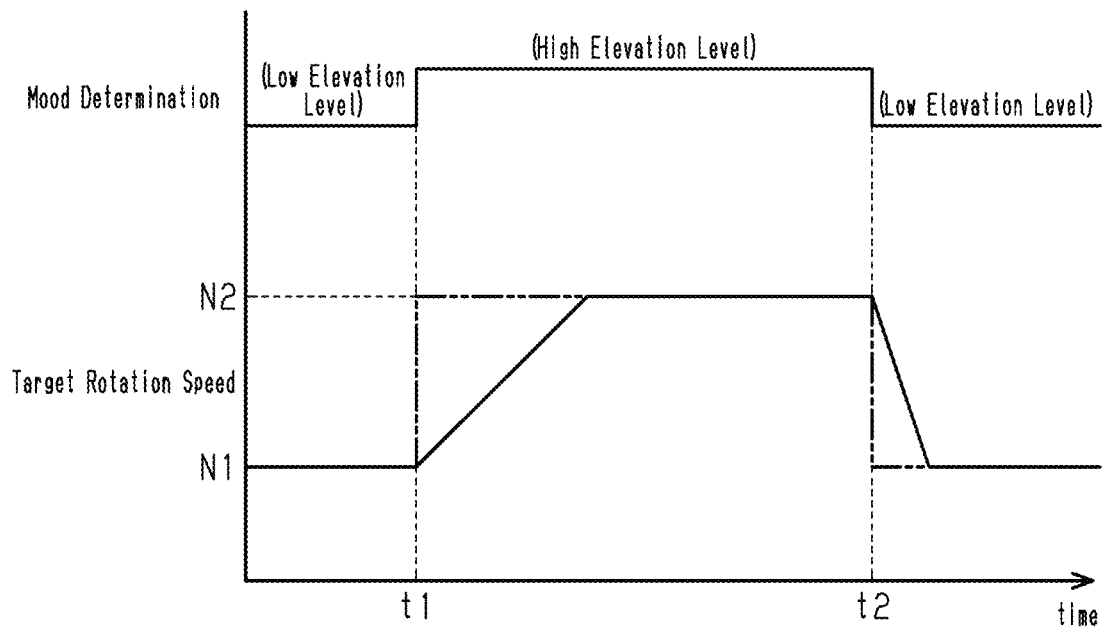
FIG. 7 is a timing diagram showing changes in a result of mood determination and changes in a target rotation speed.

Next, with reference to FIG. 7, problems caused by switching the target rotation speed in accordance with changes in the result of the mood determination will now be described. FIG. 7 shows changes in the result of the mood determination and changes in the target rotation speed. The long-dash double-short-dash lines in FIG. 7 indicate changes in the target rotation speed when the low elevation level determination is switched to the high elevation level determination at a point time t1 and then the high elevation level determination is switched to the low elevation level determination again at a point in time t2. It is assumed that the state of the vehicle other than the sounds in the passenger compartment 32 remains the same in the period shown in FIG. 7. Thus, in the period shown in FIG. 7, the target rotation speed is set to a value N1 when the low elevation level determination is made and to a value N2, which is greater than the value N1, when the high elevation level determination is made.

As indicated by the long-dash double-short-dash lines in FIG. 7, the target rotation speed changes discretely when the result of the mood determination changes. As a result, the rotation speed NE of the internal combustion engine 11 changes abruptly. This may generate a shock or rattling noise of gears in the power transmission system. In order to reduce such a shock due to changes in the target rotation speed, it is preferable to gradually change, after the result of the mood determination changes, the target rotation speed from the value corresponding to the determination result before the change to the value corresponding to the determination result after the change as indicated by the solid line in FIG. 7.

It is now assumed that the piece of music being played by the vehicle on-board audio system 34 is switched from an aggressive piece to a quiet piece, so that the result of the mood determination is switched from the high elevation level determination to the low elevation level determination. In this case, the operating noise of the power train 10 is preferably reduced immediately after the quiet piece of music starts being played. In contrast, when a quiet piece of music is switched to an aggressive piece of music, there will be no disadvantages even if the operating noise of the power train 10 continues to be low for a certain time after the aggressive piece of music starts being played. As described above, when the result of the mood determination is changed from the high elevation level determination to the low elevation level determination, a quick reduction in the operating noise of the power train 10 is desirable. In contrast, when the result of the mood determination is changed from the low elevation level determination to the high elevation level determination, a quick increase in the operating noise of the power train 10 is not necessarily desired. Thus, the rate of the gradual change of the target rotation speed is preferably different between a case in which the high elevation level determination is changed to the low elevation level determination and a case in which the low elevation level determination is changed to the high elevation level determination. Specifically, as indicated by the solid line in FIG. 7, the rate of the gradual change of the target rotation speed in the case in which the high elevation level determination is changed to the low elevation level determination is preferably higher than the rate of the gradual change of the target rotation speed in the case in which the low elevation level determination is changed to the high elevation level determination.

The gradual change process at the switching of control can also be executed when the target rotation speed is set in the manner shown in FIG. 6. Also, as discussed below, the first control and the second control may each be control that changes an operation amount of the power train 10 other than the target rotation speed. In such a case, when the first control and the second control are switched from one to the other, gradual change process for the operation amount of the power train 10 may be executed. The gradual change process executed when the control of the power train 10 is switched from the first control to the second control is referred to as a first gradual change process, and the gradual change process executed when the control of the power train 10 is switched from the second control to the first control is referred to as a second gradual change process. The first gradual change process gradually changes the operation amount of the power train 10 from a value set by the first control to a value set by the second control. The second gradual change process gradually changes the operation amount of the power train 10 from a value set by the second control to a value set by the first control. The execution of the gradual change process reduces the shock due to an abrupt change of the operation amount of the power train 10 when the first control and the second control are switched from one to the other. Also, when this gradual change process is executed, the rate of the gradual change of the operation amount of the power train 10 in the first gradual change process is preferably higher than the rate of the gradual change of the operation amount of the power train 10 in the second gradual change process.

<First Control and Second Control of Power Train 10>

In the above-described embodiment, the manner in which the target rotation speed is set is changed in order to switch the control of the power train 10 between the first control and the second control. The control of the power train 10 may be switched between the first control and the second control by some other method. Even in this case, the operating noise of the power train 10 can be properly controlled in accordance with the mood of the occupant if the second control reduces the operating noise of the power train 10 by a greater degree than the first control. Next, examples of the first control and the second control will be described.

EXAMPLE 1

Some hybrid electric vehicles such as plug-in hybrid electric vehicles switch the traveling mode between a hybrid traveling mode and an electric vehicle (EV) traveling mode according to the traveling state of the vehicle. In the hybrid traveling mode, a hybrid electric vehicle travels with the internal combustion engine 11 running. In the EV traveling mode, the hybrid electric vehicle travels using the driving force of the second generator motor 13 with the internal combustion engine 11 being in a stopped state. Switching of the traveling mode is performed based on parameters such as the state of charge SOC of the battery 15, the vehicle speed V, and the accelerator operation amount ACC. In the following description, the traveling state of the vehicle is defined by parameters such as the state of charge SOC, the vehicle speed V, and the accelerator operation amount ACC. A range of the traveling state in which the vehicle travels in the EV traveling mode will be referred to as an EV traveling range.

The operating noise of the power train 10 while the vehicle is traveling in the EV traveling mode is lower than that in the hybrid traveling mode since the internal combustion engine 11 does not generate operating noise. Accordingly, if the EV traveling range is expanded, the vehicle has a greater opportunity to travel with the operating noise of the power train 10 reduced. Thus, if the EV traveling range is expanded, the operating noise of the power train 10 will be reduced. Such change of the EV traveling range according to the result of the mood determination is achieved, for example, through the process of an EV traveling range setting routine, which will be discussed below.

Figure 8:
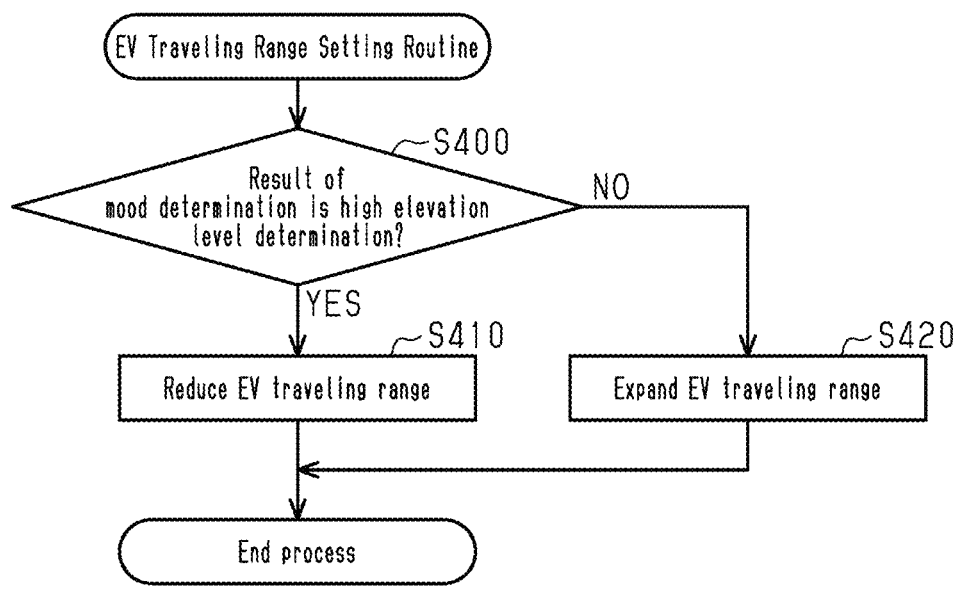
FIG. 8 is a flowchart of an EV traveling range setting routine executed by the vehicle controller in Example 1.

FIG. 8 shows a flowchart of the EV traveling range setting routine. The process of this routine is repeatedly executed by the vehicle controller 28 at specified control cycles. When starting the routine, the vehicle controller 28 first performs the occupant mood determination in step S400. When the high elevation level determination is made (YES), the vehicle controller 28 advances the process to step S410. When the low elevation level determination is made (NO), the vehicle controller 28 advances the process to step S420. When advancing the process to step S410, the vehicle controller 28 reduces the EV traveling range in step S410. When advancing the process to step S420, the vehicle controller 28 expands the EV traveling range in step S420. Expansion and reduction of the EV traveling range are performed by changing parameters that define the EV traveling range, such as the lower limit of the state of charge SOC, the upper limit of the vehicle speed V, and the upper limit of the accelerator operation amount ACC.

The first control and the second control in Example 1 switch between the hybrid traveling and the EV traveling in accordance with the traveling state of the vehicle. The second control switches between the hybrid traveling and the EV control, and the range of the traveling state of the vehicle in which the EV traveling is performed is wider in the second control than in the first control.

EXAMPLE 2

It is possible to change control of a power train in order to reduce operating noise of the power train in a conventional vehicle in which the power train includes an internal combustion engine and an automatic transmission. If the control of the power train is switched in accordance with the result of the mood determination between the first control and the second control, in which the operating noise of the power train is reduced by a greater degree than in the first control, the operating noise of the power train can be properly controlled in accordance with the mood of an occupant. The first control and the second control of the power train in such a conventional vehicle are executed, for example, in the following manner.

In the above-described vehicle, the gear of the automatic transmission is switched according to a shift schedule, which is defined by the vehicle speed V and the accelerator operation amount ACC. If a lower gear of the automatic transmission remains selected until the vehicle speed is increased to a high speed, the rotation speed NE of the internal combustion engine 11 is increased. When the rotation speed NE is high, the movable components of the internal combustion engine 11 such as the crankshaft and the gears in the automatic transmission generate loud noise. Accordingly, the operating noise of the power train can be properly controlled in the manner described below in accordance with the mood of an occupant if the shift schedule of the automatic transmission is changed in accordance with the result of the mood determination.

Figure 9:
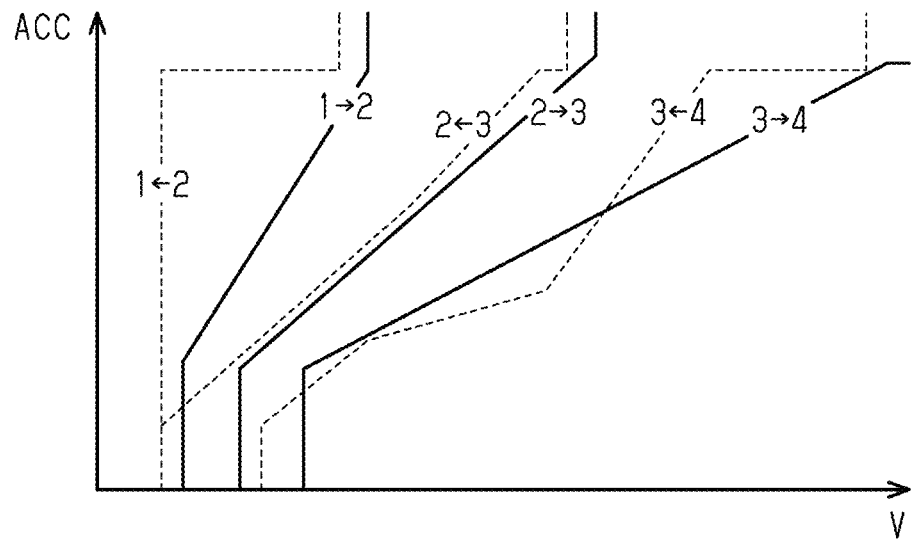
FIG. 9 is a diagram showing a manner in which a shift schedule is set through first control by the vehicle controller in Example 2.
Figure 10:
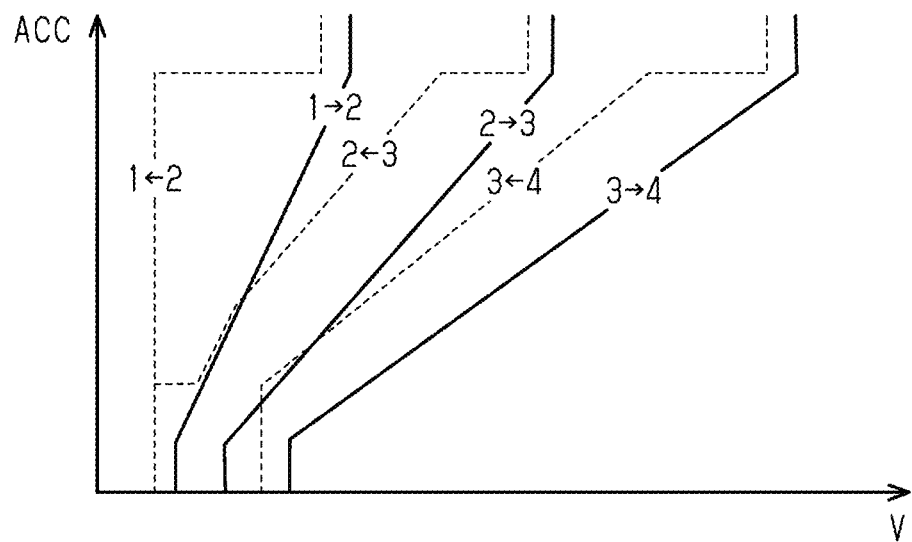
FIG. 10 is a diagram showing a manner in which the shift schedule is set through second control by the vehicle controller in Example 2.

FIG. 9 shows a shift schedule used when the high elevation level determination is made. FIG. 10 shows a shift schedule used when the low elevation level determination is made. The shift schedule shown in FIG. 10 is set to shift gears at lower vehicle speeds than the shift schedule shown in FIG. 9. In FIGS. 9 and 10, upshifting gear change lines are represented by solid lines, while downshifting gear change lines are represented by broken lines. Each gear change line is denoted by gear numbers before and after the gear change. For example, the symbol 1→2 indicates shifting of gears from the first to the second. Also, the symbol 2→1 indicates shifting of gears from the second to the first.

The first control and the second control in Example 2 shift gears of the automatic transmission according to a predetermined shift schedule. The second control shifts gears using a shift schedule that is set to shift gears at lower vehicle speeds than the shift schedule used in the first control.

EXAMPLE 3

In recent years, autonomous vehicles have been put in practical use. Autonomous vehicles automatically perform some or all of the operations that would normally be performed by the driver. Some autonomous vehicles switch the traveling mode between a manual traveling mode, which controls the vehicle speed V in accordance with operation of the accelerator by the driver, and an automatic traveling mode, which automatically controls the vehicle speed V. The automatic traveling mode allows the vehicle controller 28 to set the vehicle speed V within a range allowed by the surrounding environment. It is possible to control operating noise of a power train by setting the vehicle speed V in the automatic traveling mode. The vehicle controller 28 of Example 3 changes the manner in which the target vehicle speed is set in the automatic traveling mode in accordance with the result of the mood determination, thereby controlling the operating noise of the power train in accordance with the mood of the occupant.

Figure 11:
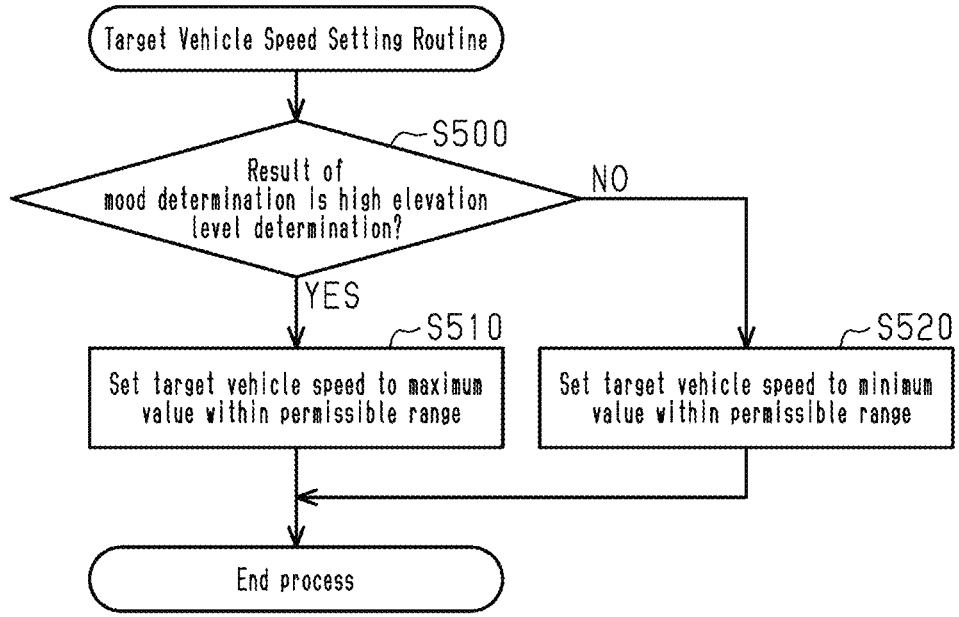
FIG. 11 is a flowchart of a target vehicle speed setting routine executed by the vehicle controller in Example 3.

FIG. 11 is a flowchart of a target vehicle speed setting routine executed by the vehicle controller 28 of Example 3 when setting the target vehicle speed in the automatic traveling mode. The vehicle controller 28 repeatedly executes this routine at specified control cycles in the automatic traveling mode.

When starting the routine, the vehicle controller 28 first performs the mood determination in step S500. When the high elevation level determination is made (YES), the vehicle controller 28 advances the process to step S510. When the low elevation level determination is made (NO), the vehicle controller 28 advances the process to step S520. When the process is advanced to step S510, the vehicle controller 28 sets the target vehicle speed to the maximum value within the permissible range of the target vehicle speed in step S510. When the process is advanced to step S520, the vehicle controller 28 sets the target vehicle speed to the minimum value within the permissible range of the target vehicle speed in step S520. The permissible range of the target vehicle speed is defined by the traveling environment of the vehicle such as the speed limit for the road on which the vehicle is traveling and the distance from the leading vehicle.

In this case, the vehicle travels at a lower vehicle speed V when the low elevation level determination is made than when the high elevation level determination is made. If the vehicle speed V decreases, the operating noise of the power train decreases. Thus, the operating noise of the power train can be controlled in accordance with the mood of the occupant by setting the target vehicle speed in the automatic traveling mode as described above.

The first control and the second control in Example 3 set the target vehicle speed in the automatic traveling mode in accordance with the traveling environment of the vehicle. Under the same traveling environment, the second control in Example 3 sets the target vehicle speed to a lower value of the vehicle speed V than the first control.

EXAMPLE 4

In the above-described automatic traveling mode, the target vehicle speed is set in the following manner in some cases. First, the maximum vehicle speed, which is the upper limit of the target vehicle speed, is set in accordance with the traveling environment of the vehicle. The target vehicle speed is set within a range of the vehicle speed V lower than or equal to the maximum vehicle speed. The vehicle controller 28 of Example 4 changes the manner in which the maximum vehicle speed is set in the automatic traveling mode in accordance with the result of the mood determination, thereby controlling the operating noise of the power train in accordance with the mood of the occupant.

Figure 12:
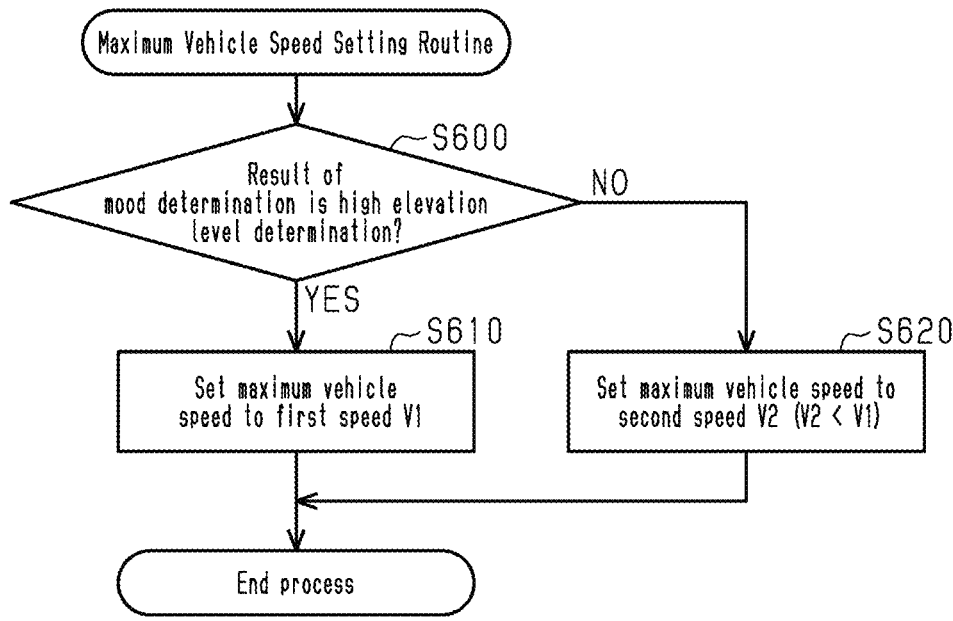
FIG. 12 is a flowchart of a maximum vehicle speed setting routine executed by the vehicle controller in Example 4.

FIG. 12 is a flowchart of a maximum vehicle speed setting routine executed by the vehicle controller 28 when setting the maximum vehicle speed in Example 4. The vehicle controller 28 repeatedly executes this routine at specified control cycles in the automatic traveling mode.

When starting the routine, the vehicle controller 28 first performs the mood determination in step S600. When the high elevation level determination is made (YES), the vehicle controller 28 advances the process to step S610. When the low elevation level determination is made (NO), the vehicle controller 28 advances the process to step S620. When the process is advanced to step S610, the vehicle controller 28 sets the maximum vehicle speed to a specified first speed V1 in step S610. When the process is advanced to step S620, the vehicle controller 28 sets the maximum vehicle speed to a specified second speed V2 in step S620. The second speed V2 is lower than the first speed V1.

The vehicle controller 28 of Example 4 is mounted on a hybrid electric vehicle that switches between hybrid traveling and EV traveling in accordance with the traveling state of the vehicle. The second speed V2 is set to the upper limit of the vehicle speed V in the EV traveling range.

In the automatic traveling mode, the vehicle controller 28 of Example 4 reduces the vehicle speed V when the low elevation level determination is made as compared to a case in which the high elevation level determination is made. Also, the EV traveling is performed if the state of charge SOC is sufficient when the low elevation level determination is made in the automatic traveling mode. Thus, the operating noise of the power train in the automatic traveling mode is more reduced when the low elevation level determination is made than when the high elevation level determination is made.

The first control and the second control in Example 4 sets the upper limit of the target vehicle speed in the automatic traveling mode. The second control in Example 4 sets the upper limit of the target vehicle speed to a value of the vehicle speed V that is lower than that in the first control. Further, the second control of Example 4 sets the upper limit of the target vehicle speed to a speed lower than or equal to the upper limit of the vehicle speed that can be achieved by the EV traveling.

In the manual traveling mode, the driver controls the vehicle speed by manipulating the accelerator. According to a design concept, it is desirable that the operation of the power train in the manual traveling mode directly reflects manipulation by the driver. If such a design concept is regarded to be important, it is undesirable that, in the manual traveling mode, the control of the power train be changed according to sounds in the passenger compartment 32 regardless of manipulation by the driver. Thus, in such a case, it is preferable that the control of the power train in accordance with the result of the mood determination be performed only in the automatic traveling mode.

Also, the range of the vehicle speed that can be controlled by the vehicle controller 28 is broader in the automatic traveling mode than in the manual traveling mode. That is, in the automatic traveling mode, adjustment of the vehicle speed facilitates the control of the operating noise of the power train. On the other hand, in the manual traveling mode, the range of the vehicle speed that can be controlled by the vehicle controller 28 is narrow. Accordingly, the operating noise of the power train cannot be controlled as easily as in the automatic traveling mode. Thus, it is preferable that switching between the first control and the second control in accordance with the determination result of the mood determination be performed only in the automatic traveling mode.

<Control of Operation Sounds of Blinker and Hazard Flasher>

The operating noise of the power train is louder during the control of the power train through the first control than during the control through the second control. Also, the control of the power train through the first control is executed when it is determined that the occupant is in an elevated mood based on the sounds in the passenger compartment 32, that is, when the passenger compartment 32 is noisy. Therefore, during the execution of the first control, the operation sounds of the blinker and the hazard flasher are indiscernible. During the control of the power train through the first control, control in Examples 5 and 6, which will be discussed below, prevents the audibility of the operation sounds of the blinker and the hazard flasher from being reduced.

EXAMPLE 5

Figure 13:
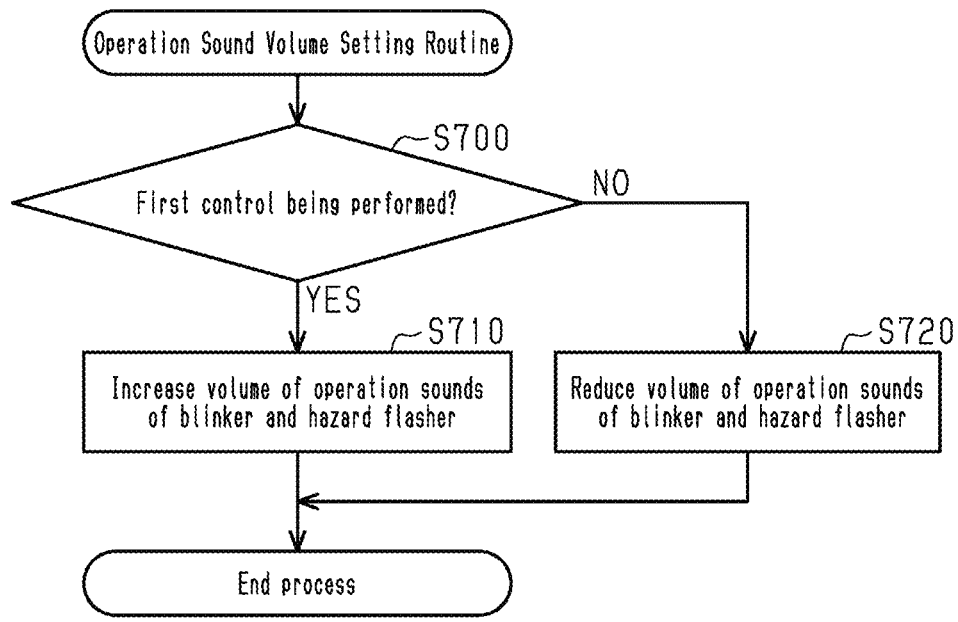
FIG. 13 is a flowchart of an operation sound volume setting routine executed by the vehicle controller in Example 5.

FIG. 13 is a flowchart of an operation sound volume setting routine executed by the vehicle controller 28 of Example 5. The vehicle controller 28 of Example 5 includes at least one of the controls of the power train according to the above-described embodiment and Examples 1 to 4. The vehicle controller 28 of Example 5 repeatedly executes this routine at specified control cycles when the vehicle is traveling.

When starting this routine, the vehicle controller 28 first determines in step S700 whether control of the power train through the first control is being executed. If the control of the power train through the first control is being executed (YES), the vehicle controller 28 increases the volume of the operation sounds of the blinker and the hazard flasher in step S710. If the control of the power train through the first control is not being executed (NO), the vehicle controller 28 reduces the volume of the operation sounds of the blinker and the hazard flasher in step S720. This makes the operation sounds of the blinker and the hazard flasher to be discernible during the control of the power train through the first control.

EXAMPLE 6

Figure 14:
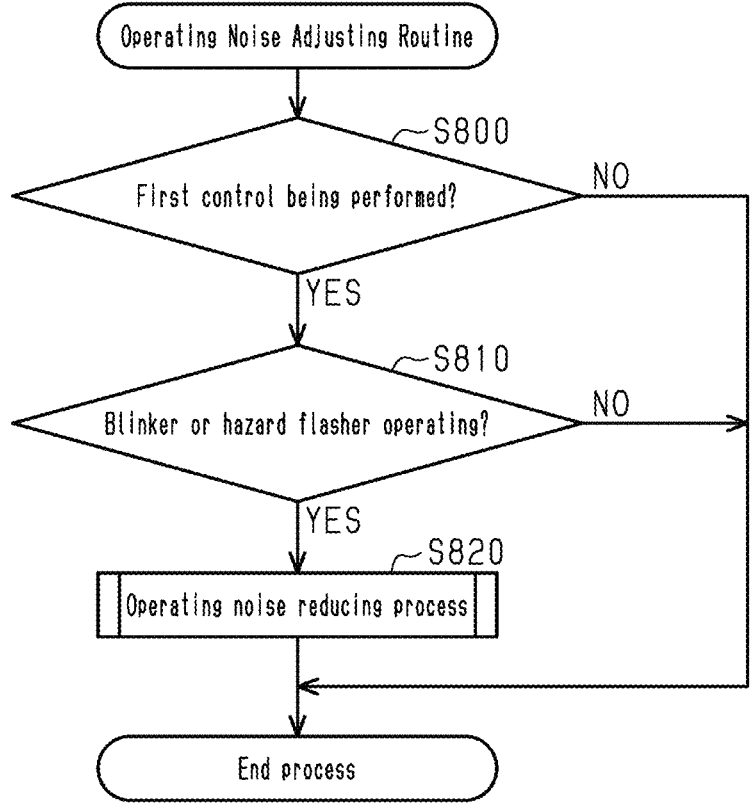
FIG. 14 is a flowchart of an operating noise adjusting routine executed by the vehicle controller in Example 6.

FIG. 14 is a flowchart of an operating noise adjusting routine executed by the vehicle controller 28 of Example 6. The vehicle controller 28 of Example 6 includes at least one of the controls of the power train according to the above-described embodiment and Examples 1 to 4. The vehicle controller 28 of Example 6 repeatedly executes this routine at specified control cycles when the vehicle is traveling.

When starting this routine, the vehicle controller 28 first determines in step S800 whether control of the power train through the first control is being executed. When the control of the power train through the first control is not being executed (NO), the vehicle controller 28 ends the process of this routine. In contrast, if the control of the power train through the first control is being executed (YES), the vehicle controller 28 advances the process to step S810.

When advancing the process to step S810, the vehicle controller 28 determines, in step S810, that one or both of the blinker and the hazard flasher are operating. If neither the blinker nor the hazard flasher is operating (NO), the vehicle controller 28 ends the process of this routine. In contrast, if at least one of the blinker and the hazard flasher is operating (YES), the vehicle controller 28 advances the process to step S820. In step S820, the vehicle controller 28 executes an operating noise reducing process for reducing operating noise of the power train.

Any process may be executed as the operating noise reducing process as long as that process controls the power train so that the operating noise is reduced. For example, control that temporarily switch the control of the power train from the first control to the second control may be executed as the operating noise reducing process. Such control of Example 6 improves the audibility of the operation sounds of the blinker and the hazard flasher during the control of the power train through the first control.

The configuration of the power train for which the above-described embodiment and Examples are employed may be changed within a range in which the controls according to the embodiment and Examples can be executed.

The vehicle controller 28 is not limited to a device that includes the processor 29 and the memory device 30. For example, the vehicle controller 28 may include a dedicated hardware circuit (e.g. an application specific integrated circuit: ASIC) that executes at least part of the processes executed in the above-described embodiment. That is, the vehicle controller 28 may be modified as long as it includes circuitry that has any one of the following configurations (a) to (c). (a) Circuitry including a processor that executes all of the above-described processes according to programs and a program storage device such as a ROM that stores the programs. (b) Circuitry including a processor and a program storage device that execute part of the above-described processes according to the programs and a dedicated hardware circuit that executes the remaining processes. (c) Circuitry including a dedicated hardware circuit that executes all of the above-described processes. Multiple software processing devices each including a processor and a program storage device and multiple dedicated hardware circuits may be provided.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle controller that controls a power train of a vehicle, wherein
    the vehicle controller is configured to switch control of the power train between a first control and a second control, the second control reducing operating noise of the power train by a greater degree than the first control,
    the vehicle controller is configured to:
        based on sounds in a passenger compartment, perform mood determination in order to determine whether an occupant of the vehicle is in a state of high tolerance for the operating noise or in a state of low tolerance for the operating noise;
        control the power train through the first control when determining that the occupant is in the state of high tolerance through the mood determination; and
        control the power train through the second control when determining that the occupant is in the state of low tolerance through the mood determination,
    the sounds in the passenger compartment include sound of music being played by a vehicle on-board audio system, and
    the vehicle controller is configured to perform the mood determination when determining that the vehicle on-board audio system is not selecting a piece of music.

2. The vehicle controller according to claim 1, wherein the vehicle controller is configured to perform the mood determination based on a signal of audio output of the vehicle on-board audio system.

3. The vehicle controller according to claim 2, further comprising
    a determiner that is configured to perform the mood determination based on the signal, the determiner having been trained through machine learning.

4. The vehicle controller according to claim 1, wherein the vehicle controller is configured to perform the mood determination based on a signal output from a microphone installed in the passenger compartment.

5. The vehicle controller according to claim 4, further comprising
    a determiner that is configured to perform the mood determination based on the signal, the determiner having been trained through machine learning.

6. The vehicle controller according to claim 1, wherein the power train includes an automatic transmission,
    the first control and the second control each shift gears of the automatic transmission according to a predetermined shift schedule, and
    the shift schedule used in the second control is set to shift gears at lower vehicle speeds than the shift schedule used in the first control.

7. The vehicle controller according to claim 1, wherein the vehicle is configured to switch a traveling mode between a manual traveling mode, which controls a vehicle speed in accordance with operation of an accelerator by a driver, and an automatic traveling mode, which automatically controls the vehicle speed,
    the first control and the second control each set a target vehicle speed in the automatic traveling mode in accordance with a traveling environment of the vehicle, and
    when the traveling environment remains identical, the second control sets the target vehicle speed to a lower value than the first control.

8. The vehicle controller according to claim 7, wherein the vehicle controller is configured to switch between the first control and the second control in accordance with a determination result of the mood determination only in the automatic traveling mode.

9. The vehicle controller according to claim 1, wherein the vehicle is configured to switch a traveling mode between a manual traveling mode, which controls a vehicle speed in accordance with operation of an accelerator by a driver, and an automatic traveling mode, which automatically controls the vehicle speed,
the first control and the second control each set a target vehicle speed in the automatic traveling mode in accordance with a traveling environment of the vehicle, and
an upper limit of the target vehicle speed is lower in the second control than in the first control.

10. The vehicle controller according to claim 9, wherein the vehicle controller is configured to switch between the first control and the second control in accordance with a determination result of the mood determination only in the automatic traveling mode.

11. The vehicle controller according to claim 1, wherein the vehicle is a hybrid electric vehicle in which the power train includes an internal combustion engine and an electric motor,
the vehicle is configured to perform hybrid traveling and EV traveling, the hybrid traveling being a mode in which the vehicle travels with the internal combustion engine running, and the EV traveling being a mode in which the vehicle travels using driving force of the electric motor with the internal combustion engine being in a stopped state,
the vehicle is configured to switch a traveling mode between a manual traveling mode, which controls a vehicle speed in accordance with operation of an accelerator by a driver, and an automatic traveling mode, which automatically controls the vehicle speed,
the first control and the second control each set a target vehicle speed in the automatic traveling mode in accordance with a traveling state of the vehicle, and
the second control sets the target vehicle speed to a speed lower than or equal to an upper limit of a vehicle speed that can be achieved by the EV traveling.

12. The vehicle controller according to claim 11, wherein the vehicle controller is configured to switch between the first control and the second control in accordance with a determination result of the mood determination only in the automatic traveling mode.

13. The vehicle controller according to claim 1, wherein the vehicle controller is configured to execute:
a first gradual change process that gradually changes an operation amount of the power train from a value set by the first control to a value set by the second control when the control of the power train is switched from the first control to the second control, and
a second gradual change process that gradually changes the operation amount of the power train from the value set by the second control to the value set by the first control when the control of the power train is switched from the second control to the first control, and
a rate of the gradual change of the operation amount is higher in the first gradual change process than in the second gradual change process.

14. The vehicle controller according to claim 1, wherein the vehicle controller is configured to cause operation sounds of a blinker and a hazard flasher to be louder during the control of the power train through the first control than during the control of the power train through the second control.

15. The vehicle controller according to claim 1, wherein the vehicle controller is configured to control the power train to reduce the operating noise of the power train when at least one of a blinker and a hazard flasher is operated during the control of the power train through the first control.

16. A vehicle controller that controls a power train of a vehicle, wherein
the vehicle controller is configured to switch control of the power train between a first control and a second control, the second control reducing operating noise of the power train by a greater degree than the first control,
the vehicle controller is configured to:
based on sounds in a passenger compartment, perform mood determination in order to determine whether an occupant of the vehicle is in a state of high tolerance for the operating noise or in a state of low tolerance for the operating noise;
control the power train through the first control when determining that the occupant is in the state of high tolerance through the mood determination; and
control the power train through the second control when determining that the occupant is in the state of low tolerance through the mood determination,
the vehicle is a hybrid electric vehicle in which the power train includes an internal combustion engine and an electric motor,
the first control and the second control are each control of a rotation speed of the electric motor, and
the second control adjusts the rotation speed of the electric motor such that a rotation speed of the internal combustion engine becomes lower than in a case in which the first control controls the rotation speed of the electric motor.

17. A vehicle controller that controls a power train of a vehicle, wherein
the vehicle controller is configured to switch control of the power train between a first control and a second control, the second control reducing operating noise of the power train by a greater degree than the first control,
the vehicle controller is configured to:
based on sounds in a passenger compartment, perform mood determination in order to determine whether an occupant of the vehicle is in a state of high tolerance for the operating noise or in a state of low tolerance for the operating noise;
control the power train through the first control when determining that the occupant is in the state of high tolerance through the mood determination; and
control the power train through the second control when determining that the occupant is in the state of low tolerance through the mood determination,
the vehicle is a hybrid electric vehicle in which the power train includes an internal combustion engine and an electric motor,
the first control and the second control each switch between hybrid traveling and EV traveling in accordance with a traveling state of the vehicle, the hybrid traveling being a mode in which the vehicle travels with the internal combustion engine running, and the EV traveling being a mode in which the vehicle travels using driving force of the electric motor with the internal combustion engine being in a stopped state, and
a range of the traveling state of the vehicle in which the EV traveling is performed is wider in the second control than in the first control.

* * * * *